United States Patent [19]

Anderson, Jr. et al.

[11] Patent Number: 5,204,401
[45] Date of Patent: Apr. 20, 1993

[54] METALLIC WATER BORNE BASE COAT COMPOSITION BASED ON ACRYLIC LATEX RESINS USING ACRYLIC RESINS DERIVED FROM VINYL MONOMERS HAVING NONIONIC AND URETHANE FUNCTIONALITY FOR ALUMINUM STORAGE AND A TREATED HECTORIE CLAY FOR RHEOLOGY CONTROL - WATER BASE 9

[75] Inventors: James L. Anderson, Jr., Grand Rapids; Horst J. Finkenauer, Waterville; David L. Newton; Jeff P. Jones, both of Toledo, all of Ohio

[73] Assignee: BASF Corporation, Parsippany, N.J.

[21] Appl. No.: 553,067

[22] Filed: Jul. 13, 1990

[51] Int. Cl.⁵ .......................... C08J 3/00; C08K 3/08; C08L 33/00; C08F 8/30
[52] U.S. Cl. .................. 524/441; 524/446; 524/522; 524/523; 524/558; 525/329.9; 525/330.5; 525/123; 525/131
[58] Field of Search .................. 525/329.9, 330.5, 123, 525/131; 524/558, 441, 446, 522, 523

[56] References Cited

U.S. PATENT DOCUMENTS

| | | | |
|---|---|---|---|
| T102,301 | 10/1982 | Walker | 524/556 |
| 3,862,071 | 1/1973 | Di Carlo | 524/437 |
| 4,164,535 | 8/1979 | Veaute | 525/123 |
| 4,243,565 | 1/1981 | Nishino et al. | 524/333 |
| 4,243,573 | 1/1981 | Simms | 525/440 |
| 4,384,096 | 5/1983 | Sonnabend | 524/522 |
| 4,408,008 | 10/1983 | Markusch | 528/71 |
| 4,436,862 | 3/1984 | Tetenbaum et al. | 524/447 |
| 4,490,499 | 12/1984 | Huybrechts | 524/546 |
| 4,507,426 | 3/1985 | Blake, Jr. | 525/123 |
| 4,730,021 | 3/1988 | Zom et al. | 525/278 |
| 4,735,995 | 4/1988 | Chettiath | 524/529 |
| 4,764,554 | 8/1988 | Tonge | 524/558 |
| 4,794,147 | 12/1988 | Savino et al. | 528/59 |

Primary Examiner—Paul R. Michl
Assistant Examiner—Patrick Niland
Attorney, Agent, or Firm—Michael R. Chipaloski

[57] ABSTRACT

There is disclosed a metallic and nonmetallic water borne base coat compositions exhibiting excellent appearance. A method for long term stability and the introduction of aluminum flake pigments into a water borne coating is also disclosed. The method is based on storing the aluminum flake in a solvent environment with introduction of the aluminum flake in to the aqueous environment just before appling the base coat coating. A water reducible acrylic resin with nonionic and acid functionality derived from vinyl monomers having nonionic and urethane functionality has been disclosed that allows for direct introduction of aluminum flake in to an aqueous environment. The coating vehicle is based on acrylic latex vehicle which exhibits excellent drying and film properties. The rheology control agent employed allows for a wetter application of the coating to the substrate. The coating compositions disclosed are also in compliance with current and proposed volatile organic compound regulations.

2 Claims, No Drawings

METALLIC WATER BORNE BASE COAT COMPOSITION BASED ON ACRYLIC LATEX RESINS USING ACRYLIC RESINS DERIVED FROM VINYL MONOMERS HAVING NONIONIC AND URETHANE FUNCTIONALITY FOR ALUMINUM STORAGE AND A TREATED HECTORIE CLAY FOR RHEOLOGY CONTROL - WATER BASE 9

FIELD OF INVENTION

The present invention is concerned with a water borne coating composition designed for the coating of transportation vehicles. The invention is related to coating compositions primarily for a base coat of a multi-coat system which includes primers and transparent clear coats, particularly with base coats containing metallic pigments, based on acrylic latex polymers.

BACKGROUND AND PRIOR ART

Related automotive paint compositions of this type are disclosed in U.S. patent applications titled METALLIC WATER BORNE BASE COAT COMPOSITION BASED ON ACRYLIC LATEX RESINS USING A WATER REDUCIBLE RESIN FOR ALUMINUM STORAGE AND A PREGELLED HECTRORITE CLAY FOR RHEOLOGY CONTROL Ser. No. 07/553065 filed Sep. 10, 1990 ABN Sep. 18, 1992, METALLIC WATER BORNE BASE COAT COMPOSITION BASED ON ACRYLIC LATEX RESINS USING A WATER REDUCIBLE RESIN FOR ALUMINUM STORAGE AND A TREATED HECTORITE CLAY FOR RHEOLOGY CONTROL Ser. No. 07/553063 filed Jul 13, 1990 ABN Sep. 18, 1992. METALLIC WATER BORNE BASE COAT COMPOSITION BASED ON ACRYLIC LATEX RESINS USING AN ACRYLIC RESIN HAVING ACID AND NONIONIC FUNCTIONALITY FOR ALUMINUM STORAGE AND A PREGELLED HETORITE CLAY FOR RHEOLOGY, CONTROL Ser. No. 07/554606 filed Sep. 10, 1990 now U.S. Pat. No. 5,166,255 , METALLIC WATER BORNE BASE COATE COMPOSITION BASED ON ACRYLIC LATEX RESINS USING AN ACRYLIC RESIN HAVING ACID AND NON-IONIC FUNCTIONALITY FOR ALUMINUM STORAGE AND A TREATED HETORITE CLAY FOR RHEOLOGY CONTROL Ser. No. 07/553100 filed Sep. 10, 1990, METALLIC WATER BORNE BASE COAT COMPOSITION BASED ON ACRYLIC LATEX RESINS AND ACRYLIC RESINS DERIVED FROM ACRYLIC MONOMERS HAVING NONIONIC, URETHANE AND ACID FUNCTIONALITY FOR ALUMINUM STORAGE AND A PREGELLED HECTORITE CLAY FOR RHEOLOGY CONTROL Ser. No. 07/553069 filed Sep. 10, 1990, METALLIC WATER BORNE BASE COAT COMPOSITION BASED ON ACRYLIC LATEX RESINS AND ACRYLIC RESINS DERIVED FROM ACRYLIC MONOMERS HAVING NONIONIC, URETHANE AND ACID FUNCTIONALITY FOR ALUMINUM STORAGE AND A TREATED HECTORITE CLAY FOR RHEOLOGY CONTROL Ser. No. 07/553070 filed Jul. 13, 1990. METALLIC WATER BORNE BASE COAT COMPOSITON BASED ON ACRYLIC LATEX RESINS USING ACRYLIC RESINS DERIVED FROM VINYL MONOMERS HAVING NONIONIC AND· URETHANE FUNCTIONALITY FOR ALUMINUM STORAGE AND A PREGELLED HECTORITE CLAY FOR RHEOLOGY CONTROL Ser. No. 07553066 filed Jul. 13, 1990, now abandoned, METALLIC WATER BORNE BASECOAT COMPOSITION BASED ON ACRYLIC LATEX RESINS USING ACRYLIC RESINS DERIVED FROM GRAFTING AN ISOCYANATE ADDUCT HAVING URETHANE AND NON-IONIC FUNCTIONALITY ON TO AN ACRYLIC RESIN HAVING ACTIVE HYDROGEN FUNCTIONALITY FOR ALUMINUM STORAGE AND A PREGELLED HECTORITE CLAY FOR RHEOLOGY CONTROL Ser. No. 07/553064 filed Sep. 10, 1990, now abandoned, METALLIC WATER BORNE BASECOAT COMPOSITION BASED ON ACRYLIC LATE RESINS USING ACRYLIC RESINS DERIVED FROM GRAFTING AN ISOCYANATE ADDUCT HAVING URETHANE AND NONIONIC FUNCTIONALITY 0N TO AN ACRYLIC RESIN HAVING ACTIVE HYDROGEN FUNCTIONALITY FOR ALUMINUM STORAGE AND A TREATED HECTORITE CLAY FOR RHEOLOGY CONTROL Ser. No. 07/553068 filed Sep. 10, 1990, and ACRYLIC LATEX METALLIC WATER BORNE BASE COAT OF IMPROVED APPEARANCE Ser No. 07/355,959 filed May 23, 1989, now abandoned. All of these U.S. patents and applications are incorporated herein by reference.

It is customary in the painting of an automobile that a series of coatings be applied to the substrate. The first coat being the primer followed by the base coat and finally the clear coat. The base coat provides the good decorative quality to the final finish via organic and inorganic pigments. In many automobile finishes, a metallic finish is desired. To obtain this metallic effect, metallic pigments are present in the base coat, typically aluminum flakes. The aluminum flakes in the base coat contribute to the glossy lustrous appearance of the final finish.

Another feature that aluminum flakes contribute to the appearance of the final finish is the change of brightness as the viewing angle is changed. Typically, the final finish is bright when viewed at a 90 degree angle, however, when the viewing angle is changed to 180 degrees, the coating has a dark appearance. This phenomenon is known as "flop" in the automotive field and is highly desired. The ultimate in "flop" is achieved when the aluminum flakes are orientated parallel to the substrate. Random orientation of the aluminum flake results in a final finish exhibiting bright and dark areas when viewed at 90 degrees. This appearance is known as mottling and detracts from the final appearance of the final finish. In general, the metal fixation in base coats is achieved by a rheology modifiers such as inorganic and organic thickeners. The particular rheology control agent used in this invention results in a non-mottled, high head-on-brightness, outstanding flop, and high quality finish, even in the case of a silver metallic base coat. Also, use of this particular rheology control agent allows the coating to be applied wetter during the application process.

In the current market place, automobile coatings, especially base coats, contain a high level of organic solvent. With increasing concern about the volatile organic emissions into the atmosphere, an intensive effort in research and development of coatings containing mainly water as the solvent with a small level of organic solvent is under way. An example of such an effort is U.S. Pat. No. 4,730,020 which discloses a water-dilutable coating composition comprising specifically selected acrylic copolymers, solvent blends, coloring and/or optical effect pigments and polymer dispersions. To obtain the desired optical effect of the metallic flakes, the correct combination of acrylic copolymer and solvent blend must be achieved. An aqueous thermosetting acrylic resin described by U.S. Pat. No. 3,862,071 controls the metallic pigment orientation by the addition of a water insoluble copolymer. Microgel technology as described by GB-PS No. 2,073,609 also results in the proper metal orientation. Also disclosed in DE No. 3,210,051 is an attempt to control metallic pigment orientation using polyurethane dispersions. Cellulosic esters have also been used to control metal fixation as disclosed in DE No 3,216,549. The rheology modifiers or rheology control agents for water borne coatings have poor shelve stability, poor weathering characteristics and are cumbersome to use. The particular rheology control agent used in this invention results in a nonmottled, high head-on-brightness, outstanding flop, and high quality finish, even in the case of a silver metallic base coat and does not suffer from the problems cited earlier.

The use of acrylic latex resin in a base coat formulation has been disclosed in European Application 0 287 144 Al, however, this application does not disclose any rheology control agents, pigment dispersion procedures, method for aluminum storage and requires that the acrylic latex resin be prepared in 2 or more steps by emulsion polymerization.

Typically, coating compositions used in the automotive market, especially in the automotive after market, are produced by mixing various bases to give the desired color. These coating compositions are then applied in about 1-5 days after preparation. A major problem is the introduction of aluminum flakes which react with water to generate hydrogen gas. Therefore, the aluminum flake must be segregated from the rest of the water borne components to minimize this hazard.

SUMMARY OF INVENTION

This invention relates to water borne compositions for use in metallic and nonmetallic base coats in a multicoat system for the automotive market. The present invention is concerned with an acrylic latex coating composition for use in an automotive paint base coat composition. Typically, a water borne basecoat coating composition for the refinish market are in a kit form. The invention also relates to base coats containing pigments, metallic pigments, organic solvents, and conventional paint additives. The outstanding metal control exhibited by this coating composition is attributed to the rheology control agent, the film shrinkage of the acrylic latex vehicle while drying and a wax. The use of acrylic latex results in a very fast dry time. This coating composition provides a base coat that satisfies current and proposed volatile organic compound regulations. Even with conventional non-metallic pigments, the coating exhibits excellent appearance.

This invention describes a method for the storage of aluminum flake in an organic medium with introduction of the flakes into the aqueous environment just prior to application of the coating system. This method minimizes the potential hazard of the aluminum flake reacting with water to form hydrogen gas during storage. This method can also be used for the storage of other water sensitive pigments such as copper and brass. Other pigments such as plastic films, mica and coated metallic foils can be stored using this method.

The automotive metallic base coat paint comprises three components; A) aluminum base, B) pigmented or unpigmented base, and C) reducer base. The automotive nonmetallic base coat paint comprises two components; A) pigmented base and B) reducer base. Component A, the aluminum base, is composed of metallic flakes slurred into a solvent borne acrylic resin and water miscible solvents. The acrylic resin used in this component has nonionic, urethane and acid functionality allowing for direct introduction of the component into aqueous acrylic latex resin system. The aluminum dispersion resin is an acrylic polymer in water-miscible solvent(s), formed by the free-radical initiated polymerization of ethylenically unsaturated monomers. A novel polyether-urethane containing ethylenically unsaturated monomer is included in the monomer mixture, to give a final poly(ethylene oxide) level of 1-50% by weight, preferably 5-20% by weight. The number average molecular weight of the polymer is between 1,000 and 50,000 atomic mass units, its Glass Transition Temperature (Tg) is between $-20°$ and $+50°$ C. (calculated by the Fox method), a hydroxyl number of 0-50, and its acid number is from 5 to 50 milligrams of KOH per gram of resin solids. The viscosity of the final polymer is 3,000-10,000 cps with a solids content of 60-70% by weight Commonly used metallic pigments, used singularly or as a mixture are copper, copper alloys, aluminum, steel, mica, plastic films, and coated metallic foils, preferably aluminum at a level of 4-30% by weight, preferably 20-30% by weight. The aluminum contains 5-35%, preferably 20-30% by weight of the solvent borne water reducible acrylic resin. The organic solvent for this base must be water miscible. Examples of solvents are methanol, ethanol, propanol, butanol, N-methylpyrrolidone, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene methyl ether, propylene ethyl ether, propylene propyl ether, propylene butyl ether, propylene hexyl ether, dipropylene methyl ether, dipropylene ethyl ether, dipropylene propyl ether, and dipropylene butyl ether.

Component A, the aluminum base, has a total solids level of 25-55 by weight, total volatile organic solvent level of 35-50% weight, total metallic pigment level of 4-30% by weight and total binder level of 5-35% by weight.

By binder we mean the nonvolatile portion of the resinous vehicle of a coating, in particular reference is given to Paint & Coatings Dictonary, Published by The Federation of Societies for Coatings Technology, 1978. By solids we mean the nonvolatile matter in a coating composition left behind after drying, in particular reference is given to Paint & Coatings Dectonary, Published by the Federation of Societies for Coatings Technology, 1978.

Component B, pigmented base, contains acrylic latex grinding polymer and acrylic latex film forming vehicle at a level of 5-50%, preferably 15-50%. This level depends on the pigment in the component. The level of pigment in component C is 0.5-35% by weight, this level depends on the pigment characteristics also. Typically, a pigment to binder weight ratio of about 10/100 to 300/100 is acceptable. The pigments are typically ground using conventional dispersion equipment such as sand mills, pearl mills, ball mills, horizonal mills, and vertical mills. Optional wetting agents, surfactants, and dispersing aids can be employed. This component may also contain a wax composed of ethylene and/or ethylenically unsaturated monomers alkyl (meth)acrylates such as methyl (meth)acrylate, ethyl (meth)acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth)acrylate, cyclohexyl (meth)acrylate, lauryl (meth)acrylate, octyl (meth)acrylate, decyl (meth)acrylate, stearyl (meth)acrylate, dicyclopentadienyl (meth)acrylate, and isobornyl (meth)acrylate; aryl monomers such as styrene, alphamethyl styrene, vinyl toluene, t-butyl styrene, benzyl (meth)acrylate, and 2-benzylethyl (meth)acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth)acrylate; acid functional monomers such as acrylic acid, methacrylic acid, maleic acid, and itaconic acid. Typically, the particle size of the wax particle in the final dispersion is 0.5 microns to 50 microns, preferably 1.0 to 20.0 microns. The wax is dispersed by conventional techniques or emulsified in to the resin system to the desired particle size. The proper amount of the wax dispersion is then added to the pigmented base. The pH of the pigmented base can be adjusted using ammonia or any water soluble primary amines, secondary amines, tertiary amines, polyamines and hydroxyamines, such as ethanolamine, diethanolamine, triethanolamine, n-methylethanol amine, N,N diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetraamine, hexamethylene tetramine, triethylamine and the like. The prefered base is ammonia. This component may also contain a water dipersible polyurethane resin at a level of 0-25% by weight. Component B, the pigmented base, has a total solids level of 5-0% by weight, a total pigment level of 0.0-45% by weight total organic solvent level of 0-25% by weight, a total binder of 20-60% by weight, a total wax level of 0-20% by weight, a total water level of 40 95% by weight, a pH range of 7-9 and a total water dispersible polyurethane resin at a level of 0-25% by weight.

Component C, reducer base, contains an aqueous solution of; (1) synthetic sodium lithium magnesium silicate hectorite clay at a level of 0.1-10% by weight, preferably 0.5-3.0% by weight, (2) a polypropylene glycol at a level of 0.1-10% by weight and (3) water miscible solvent at a level of 0-25% by weight, (4) a total solids level of 0.1-20% by weight and (5) a total water level of 50.0-99.9% by weight. Component B, pigmented base, contains acrylic latex grinding polymer and acrylic latex film forming vehicle at a level of 5-50%, preferably 15-50%. This level depends on the pigment in the component. The level of pigment in component B is 0.5-35% by weight, this level depends on the pigment characteristics also. Typically, a pigment to binder weight ratio of about 10/100 to 300/100 is acceptable. The pigments are typically ground using conventional dispersion equipment such as sand mills, pearl mills, ball mills, horizonal mills, and vertical mills. Optional wetting agents, surfactants, and dispersing aids can be employed. This component may also contain a wax composed of ethylene and/or ethylenically unsaturated monomers alkyl (meth)acrylates such as methyl (meth)acrylate, ethyl (meth)acrylate, propyl (meth)acrylate, 2-propyl (meth)acrylate, butyl (meth)acrylate, 2-butyl(meth)acrylate, 2-methylpropyl (meth)acrylate, t-butyl (meth)acrylate, 2-ethylhexyl (meth)acrylate, cyclohexyl (meth)acrylate, lauryl (meth)acrylate, octyl (meth)acrylate, decyl (meth)acrylate, stearyl (meth)acrylate, dicyclopentadienyl (meth)acrylate, and isobornyl (meth)acrylate; aryl monomers such as styrene, alpha-methyl styrene, vinyl toluene, t-butyl styrene, benzyl (meth)acrylate, and 2-benzylethyl (meth)-acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth)acrylate; acid functional monomers such as acrylic acid, methacrylic acid, maleic acid, and itaconic acid. Typically, the particle size of the wax particle in the final dispersion is 0.5 microns to 50 microns, preferably 1.0 to 20.0 microns. The wax is dispersed by conventional techniques or emulsified in to the resin system to the desired particle size. The proper amount of the wax dispersion is then added to the pigmented base. The pH of the pigmented base can be adjusted using ammonia or any water soluble primary amines, secondary amines, tertiary amines, polyamines and hydroxyamines, such as ethanolamine, diethanolamine, triethanolamine, n-methylethanol amine, N,N diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetraamine, hexamethylene tetramine, triethylamine and the like. The preferred base is ammonia.

DESCRIPTION OF INVENTION

This invention is directed to a coating composition for a water borne base coat especially designed for the automotive market. This invention describes a method for the introduction of metallic flakes into a water borne coating resulting in a highly superior base coat. The proper metal fixation is accomplished by the use of a novel rheology control agent which employs a synthetic sodium lithium magnesium silicate hetorite clay and a polypropylene glycol. The metallic base coat is broken down into three bases that are combined just prior to application of the base coat. The nonmetallic base coat is broken down into two bases that are combined just prior to application of the base coat.

The invention describes a method for the storage of aluminum flake in an organic medium with introduction of the flakes directly into the aqueous environment just prior to application of the coating system. An acrylic resin with both nonionic and acid functionality has been developed that allows for this introduction of the aluminum flakes into the aqueous environment without the neutralization step. This method minimizes the potential hazard of the aluminum flake reacting with water to form hydrogen gas during storage.

Component A, aluminum base, is an aluminum slurry in an organic environment containing an acrylic resin having nonionic, urethane and acid functionality. The aluminum dispersion resin is an acrylic polymer in water-miscible solvent(s), formed by the free-radical initiated polymerization of ethylenically unsaturated monomers.

The ethlenically unsaturated polyether-urethane containing monomer is systnesized by reacting a capped polyether glycol with a radical having isocyanate and ethlenically unsaturated functionality in such a way where the final urethane-polyether monomer has ethlenically unsaturated functionality for free radical polymerization. The capped polyether glycol has the following general formula:

R—O—[CH$_2$—CH(X)—O]$_n$—H wherein
X represents a monofunctional radical having from 1 to 8 carbon atoms, preferably a hydrogen or a methyl group.
R represents a monofunctional, difunctional, trifunctional hydrocarbon radicals having 1 to 40 carbons,
n represents the number of moles of ethylene oxide and can range from 0 to 50.

The mutlifunctional isocyanate has the following general formula:

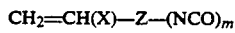

CH$_2$=CH(X)—Z—(NCO)$_m$ wherein
Z represents a hydrocarbon radical having from 1 to 18 carbon and nitrogen atoms,
m represents the number of isocyanate groups.
X represents a monofunctional radical having from 1 to 8 carbon atoms, preferably a hydrogen or a methyl group.

The organic polyisocyanate which is reacted with the polyether glycol as described is essentially any polyisocyanate and is preferalby a monoisocyanate with ethylenically unsaturated functionality. The prefered polyisocyanate compound having ethylenically unsaturated functionality is meta-isopropenylalpha, alpha-dimethylisocyanate. The urethane-polyether monomer may be prepared in conventional manner by reacting a stoichiometric excess of the organic polyisocyanate compound with the appropirate polyether glycol under anhydrous conditions at a temperature between about 20 C to 130 C until the reaction between the isocyanate groups and the active hydrogen group of the polyedther glycol is complete. The isocyanate groups and the active hydrogen group of the polyether glycol are allowed to react in such a way that the stoichiometry of the isocyanate group to the active hydrogen groups is 1.0:0.8 to about 1:1, preferably 1:1. The general formula for this urethane-polyether monomer is as follows:

CH$_2$=CH(X)—Z—[N(H)—C(O)—(O—CH(X-)—CH$_2$)$_n$—O—R]$_m$ wherein:
X represents a monofunctional radical having from 1 to 8 carbon atoms, preferably a hydrogen or a methyl group.
R represents a monofunctional, difunctional, trifunctional hydrocarbon radicals having 1 to 40 carbons,
n represents the number of moles of ethylene oxide and can range from 0 to 50.

Z represents a hydrocarbon radical having from 1 to 18 carbon and nitrogen atoms,
m represents the number of isocyanate groups.

The reaction between the isocyanate group and the active hydrogen group of the polyether glycol may also be catalyzed. Examples of such catalyst are dibutyltin dilaurate, dibutyltin diacetate, 1,4-iaza(2,2,2)bicyclooctane, tetramethylbutanediamine, zinc octoate and stannous octate. Solvents used must be nonreactive toward the isocyanate and also be water miscible. Examples of solvents meeting these requirments are acetone, methylethylketone, dimethylformamide, N-methylpyrrolidone, ethylene glycol diacetate and propylene glycol diacetate. A free radical inhibitor can also be present in the reaction mixture. The preferred inhibitor is butylated hydroxy toluene.

The final aluminum dispersion resin is an acrylic polymer in water miscible solvent(s), formed by the free radical initiated polymerization of ethylenically unstaurated monomers including the urethane-polyether monomer previsously described.

Examples of ethylenically unsaturated monomers which can be used for this purpose include alkyl (meth-)acrylates such as methyl (meth)acrylate, ethyl (meth)acrylate, propyl (meth)acrylate, 2-propyl (meth)acrylate, butyl (meth)acrylate, 2-butyl (meth)acrylate, 2-methylpropyl (meth)acrylate, t-butyl (meth)acrylate, 2-ethylhexyl (meth)acrylate, cyclohexyl (meth)acrylate, lauryl (meth)acrylate, octyl (meth)acrylate, decyl (meth)acrylate, stearyl (meth)acrylate, dicyclopentadienyl (meth-)acrylate, and isobornyl (meth)acrylate; aryl monomers such as styrene, alpha-methyl styrene, vinyl toluene, t-butyl styrene, benzyl (meth)acrylate, and 2-benzylethyl (meth)-acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth)acrylate; acid functional monomers such as acrylic acid, methacrylic acid, maleic acid, and itaconic acid.

The acrylic polymer is prepared in organic solvents that are water miscible, such as methyl ethyl ketone, acetone, ethanol, methanol, propanol, butanol, N-methylpyrrolidone, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene methyl ether, propylene ethyl ether, propylene propyl ether, propylene butyl ether, propylene hexyl ether, dipropylene methyl ether, dipropylene ethyl ether, dipropylene propyl ether, methyl ethyl ketone and dipropylene butyl ether. The acrylic polymer is prepared via normal solution polymerization techniques. Examples of free-radical initiators include peroxides, such as benzoyl peroxide, tertiary-butyl peracetate, tertiary-butyl peroctoate, tertiary-butyl perbenzoate, and di-tertiary butyl peroxide; and 1,1,-azobis(alkyl nitrile)s, such as , '-azobis(isobutyronitrile), and 1,1,-azobis(cyclohexane carbonitrile). Optionally, surfactants can also be present during the polymerization at a level of 0.1–2.0% by weight.

Any commercial aluminum paste available for solvent borne or water borne applications can be used in the preparation of component A. The amount of aluminum flake in the component is 4–30% by weight, preferably 23–30% by weight.

Other nonmetallic and metallic pigments that can be incorporated into this base include copper, copper alloys, mica, coated metallic foils, plastic flakes and steel. However, this is not an inclusive list.

Additional organic solvent may be needed to reduce the viscosity of the acrylic resin. Acceptable solvents must be water miscible such as methyl ethyl ketone, acetone, ethanol, methanol, propanol, butanol, N-methylpyrrolidone, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene methyl ether, propylene ethyl ether, propylene propyl ether, propylene butyl ether, propylene hexyl ether, dipropylene methyl ether, dipropylene ethyl ether, dipropylene propyl ether and dipropylene butyl ether. Component A, the aluminum base, has a total solids level of 25–55% by weight, 5–35% binder by weight, 35–50% organic solvent by weight and total metallic pigment level of 4–30% by weight. Additional wetting, antisettling additives common to the paint industry may be added.

The preparation of component A, the aluminum base, is critical for the proper appearance of the aluminum flake in the final coating. The proper amount of the acrylic resin solution is dissolved into the proper amount of water miscible organic solvent, such as methyl ethyl ketone, acetone, ethanol, methanol, propanol, butanol, N-methylpyrrolidone, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene methyl ether, propylene ethyl ether, propylene propyl ether, propylene butyl ether, propylene hexyl ether, dipropylene methyl ether, dipropylene ethyl ether, dipropylene propyl ether and dipropylene butyl ether. The proper amount of the aluminum paste is slurred into the above described resin solution. The aluminum slurry must be stirred until the base is smooth and uniform.

Component B, pigmented base, imparts the coloring effect upon the coating composition. The resin used for the dispersing of the pigments is an acrylic latex. Typical properties of this acrylic latex are as follows:

| Solids content, % | 20–60 |
| --- | --- |
| pH | 7 to 10 |
| Weight per gallon, lbs | 8.0 to 9.0 |
| Minimum film formation temperature, C. | 0 to 70 |
| Sward hardness | 25 to 110 |
| Mechanical stability | OK |
| Glass transition temperature, C. | 10 to 50 |
| Average molecular weight | 150,000 to 300,000 |
| Number of average molecular weight | 30,000 to 60,000 |
| Acid number on solids | 5 to 35 |
| Volatile organic solvents, % | 0 to 20 |
| Particle size, nm | 50 to 150 |

Especially preferred acrylic lattices are Neocryl A-622, Neocryl A-640, Neocryl A-6037 sold by ICI Resins, Joncryl J-537, Joncryl J-538 sold by Johnson Wax, Arolon 860-W-45 sold by NL Industries. The level of this resin in component C is 15–60% by weight, preferably 20–40% by weight. The organic, inorganic pigments and/or dyestuffs are ground with this resin employing standard techniques. Examples of dispersing equipment are ball mills, pebble mills, pearl mills, horizontal mills, and vertical mills. Examples of pigments and dyestuffs but not limited to are titanium dioxide, graphite, carbon black, zinc oxide, cadmium sulfide, chromium oxide, zinc sulfide, zinc chromate, strontium chromate, barium chromate, lead chromate lead cyanamide, lead silico chromate, chromium oxide, zinc sulfide, yellow nickel titanium, yellow chromium titanium, red iron oxide, yellow iron oxide, transparent red iron oxide, transparent yellow oxide, black iron oxide, ultramarine blue, phthalocyanine complexes, amaranth, quinacridones, halogenated thioindigo pigments, naphthol reds and browns, anthraquinones, dioxazine violet, isoindoline yellows, arylide yellow and oranges and extender pigments such as magnesium silicate, aluminum silicate, calcium silicate, calcium carbonate, fumed silica, barium sulfate, among others. The level of pigment/dyestuff in component C is 0.0–45.0% by weight, typically 0–25%. This component may also contain a wax composed of ethylene and/or ethylenically unsaturated monomers alkyl (meth)acrylates such as methyl (meth)acrylate, ethyl (meth)-acrylate, propyl (meth)acrylate, 2-propyl (meth)acrylate, butyl (meth)acrylate, 2-butyl(meth)acrylate, 2-methylpropyl (meth)-acrylate, t-butyl (meth)acrylate, 2-ethylhexyl (meth)acrylate, cyclohexyl (meth)acrylate, lauryl (meth)acrylate, octyl (meth)-acrylate, decyl (meth)acrylate, stearyl (meth)acrylate, dicyclopentadienyl (meth)acrylate, and isobornyl (meth)acrylate; aryl monomers such as styrene, alpha-methyl styrene, vinyl toluene, t-butyl styrene, benzyl (meth)acrylate, and 2-benzylethyl (meth)acrylate; hydroxy monomers such as hydroxyethyl (meth)acrylate, hydroxypropyl (meth)acrylate, hydroxybutyl (meth)acrylate, sec-hydroxybutyl (meth)acrylate, and hydroxyoctyl (meth)acrylate; acid functional monomers such as acrylic acid, methacrylic acid, maleic acid, and itaconic acid. Typically, the particle size of the wax particle in the final dispersion is 0.5 micron to 50 micron, preferably 1.0 micron to 20.0 micron. Typical properties of this wax are as follows:

| Acid Number (mg KOH/g) | 0–50 |
| --- | --- |
| Hardness, dmm (ASTM D-5) | <2.0 |
| Mettler Drop Point, C. (ASTM D-3104) | 100–150 |
| Particle Size, micron | 0.5–10.0 |
| Hydroxyl Number | 0–50 |

Typically, the wax is dispersed by conventional techniques in to the resin system to the desired particle size or be prepared by emulsion techniques. The proper amount of the wax dispersion is then added to the pigmented base. This component may also contain other conventional paint additives such as dispersing aids, anti-settling aids, wetting aids, thickening agents, extenders, plasticizers, stabilizers, light stabilizers, antifoams, defoamers and catalysts singly or a multitude of them at the conventional levels. Also present in this component is a water miscible solvent such as methyl ethyl ketone, acetone, ethanol, methanol, propanol, butanol, N-methylpyrrolidone, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene methyl ether, propylene ethyl ether, propylene propyl ether, propylene butyl ether, propylene hexyl ether, dipropylene methyl ether, dipropylene ethyl ether, dipropylene propyl ether and dipropylene butyl ether at a level of 0–25% by weight, preferably 0–12% by weight. Examples of water reducible polyurethanes are NeoRez R-960, R-966, R-967, R-9637 manufactured by ICI Resins and Spensol L51 and L53 manufactured by NL Industries.

Component B, the pigmented base, has a total solids level of 5–60% by weight, a total pigment level of 0.0–45% by weight total organic solvent level of 0–25% by weight, a total binder of 20–60% by weight, a total wax level of 0–20% by weight, a total polyurethane level of 0–25% by weight, a total water level of 40–95% by wieght and a pH range of 7–9. The pH of the base can be adjusted using ammonia or other water soluble primary amines, secondary amines, tertiary amines, polyamines and hydroxyamines, such as ethanolamine, diethanolamine, triethanolamine, n-methylethanol amine, N,N diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetraamine, hexamethylene tetramine, triethylamine and the like.

Component C, reducer base, is an aqueous solution containing a dispersion of synthetic sodium lithium magnesium silicate hectorite clay and a polypropylene glycol. Addition of a polypropylene glycol to the hectorite clay results in a low viscosity dispersion. This low viscosity dispersion of the hectorite clay allows for easy incorportion of the dispersion into the paint composition. The typical properties of the synthetic sodium lithium magnesium silicate clay are as follows:

| Solids Content, % | 95–100 |
| --- | --- |
| Typical Analysis | |
| SiO2 | 50–65 |
| MgO | 25–35 |
| Li2O | 0.1–1.5 |
| Na2O | 1.5–3.5 |
| | 3.0–12.0 |
| Appearance | White free flowing powder |
| Particle Size | <2% greater than 250 microns |
| Surface Area, m2g | 370s |

Especially preferred synthetic sodium lithium magnesium silicate hectorite clay is Laponite RD, available from Laporte, Inc. This hectorite clay is present in this component at a level of 0.1–10% by weight, preferably 0.5–3.0% by weight. This component also contains a polypropylene glycol at a level of 0.1–10% by weight. The molecular weight range of the polypropylene glycol is 435 to 3900. The hectorite clay can be dispersed in the aqueous medium by Cowles or agitation. A water miscible solvent may also be present in this component such as methyl ethyl ketone, acetone, ethanol, methanol, propanol, butanol, N-methylpyrolidone, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene methyl ether, propylene ethyl ether, propylene propyl ether, propylene butyl ether, propylene hexyl ether, dipropylene methyl ether, dipropylene ethyl ether, dipropylene propyl ether and dipropylene butyl ether at a level of 0–25% by weight, preferably 0–12% by weight.

Other water reducible resin may be added to the coating to improve certain film properties such as aqueous one-component aliphatic polyurethane dispersions, aromatic polyurethane dispersions, polyesters, and alkyds.

Addition of an acrylic acid and/or polyurethane based thickeners known to the art may also be added to achieve desired properties. The incorporation of metal oxides such as zinc oxide may also improve the humidity resistance of the final film.

Additional anionic and nonionic surfactants can be added to the paint composition to increase wetting of the substrate by the coating such as FC-120, FC-430 sold by 3M, Surfynol 104, Surfynol 440 sold by Air Products, Triton X-100 sold by Rohm and Haas, Troysol LAC sold by Troy Chemical Company, Aerosol OT's sold by American Cyanamid including the salts of dialkyl sulfosuccinates and Igepal's sold by GAF including the ethoxylated alkyl phenols.

This base coat composition exhibits a very high viscosity at low shear rate while having a low viscosity at high shear rates. This phenomenon results in the outstanding metal effect this coating composition possesses. The efflux time of the coating through a #4 Ford cup is 15 to 30 seconds at 23 C.

The coating composition can be applied using conventional spray equipment or high volume low pressure spray equipment resulting in a high quality finish. Other modes of application are roller coating, brushing, sprinkling, flow coating, dipping, electrostatic spraying, or electrophoresis. Suitable substrates may be made of wood, metal, and synthetic material. After a flash off time of 15 to 45 minutes, a transparent top coat can be applied over this base coat. The preferred transparent clear coat is two component, based on acrylic and/or polyester resins cured with polyisocyanates. Other examples of cured transparent clear coats are acrylic and/or polyester resins cured with silanes, acrylic and/or polyester acid cured epoxy coatings, and acrylic and/or polyester resins cured with aminoplast resins, however, this is not an inclusive list.

PREFERRED EMBODIMENTS OF INVENTION

The following examples illustrate the invention without limiting the scope thereof.

Approximately 134 grams of Propylene glycol monopropyl ether is combined with 5 grams of Methyl Ethyl Ketone in a one-liter distillation flask, fitted with a water-cooled condenser, under a Nitrogen blanket. The mixture is brought to reflux (~140° C.), the Nitrogen flow reduced to a minimum, and 454 grams of a mixture of ,β-ethylenically unsaturated monomers is pumped into the flask over two hours. The monomer mixture consists of Methyl Methacrylate—7.2%, Styrene—18.8%, n-Butyl Methacrylate —48.1%, Acrylic Acid—1.7%, 2-Ethylhexyl Acrylate —2.4%, alpha-Methyl Styrene—1.7%, and Polyethylene Glycol Monomethacrylate (containing 10 Ethylene oxide units)—19.9%.

While the monomers are being pumped into the reaction flask, a mixture of 11 grams of free-radical initiator (t-Butyl Perbenzoate) and 50 grams solvent (propylene glycol monopropyl ether) is simultaneously fed into the flask over two hours.

After adding all the monomers, solvent, and initiator (and flushing the pumps and feed lines with propylene glycol monopropyl ether), the reaction is held at reflux. After thirty minutes at reflux, a mixture of 1.7 grams of initiator and 35 grams of solvent (propylene glycol monopropyl ether) is pumped into the reaction flask over ten minutes. After adding the initiator and solvent mixture, the reaction is held at reflux. After one to two hours at reflux, the reaction is cooled and filtered into a lined metal can. The viscosity of this polymer is between 6,000 and 8,000 cps at 63.4% non-volatile by weight, measured at 25° C., and its acid number is from 14 to 16 milligrams of KOH per gram of resin solids.

Preparation of Component A—Aluminum Base

A commerical solvent borne aluminum paste, 60.0g, was added to 60.0g of butoxyethanol. The mixture was stirred until a homogeneous dispersion was produced. To this dispersion, 30.0g, of the resin described above was added to the dispersion and the entire mixture stirred until a smooth, uniform slurry was produced. This aluminum base contains 39% volatile organic solvent by weight, a soldis level of 61.0% by weight, a binder level of 13% by weight and an aluminum flake level of 26.0% by weight.

Preparation of Component B—Pigmented Base

The following pigment slurry was prepared, 12.2 g of NeoCryl A-6037, 14.8 g of NeoCryl A-640, 0.3 g of 30% aqueous ammonia, 3.2 g of Perrindo Maroon R-6424 manufactured by Mobay Corporation, 0.1 g of a defoamer and 0.05 g of Surfynol 104BC manufactured by Air Products. The above mixture were mixed together and predispersed using a Cowles blade. The mixture was then ground on a sand mill until the desired particle size was achieved. A let down solution containing 29.5 g of NeoCryl A-622, 2.6 g of butoxyethanol, 1.3 g of deionized water and 0.03 g of 1% aqueous solution of FC-120 was added to the grind portion under agitation. An unpigmented base can be prepared using the procedure above with the elimination of the Perrindo Maroon R-6424 pigment. A wax dispersion was prepared by grinding 50.0 g of a wax, 50.0 g of unpigmented resin solution, 50.0 g of deionized water and 50.0 g of butoxyethanol. This paste was ground to the desired particle size using conventional techniques. To the pigmented and unpigmented bases described above, 6.0 g of this wax dispersion was added with stirring. Also added to the pigmented and unpigmented bases describee above was 16.0 g of NeoRez R-9637 manufactured by ICI Resins. The resulting pigmented base had a pH of 8.4, a solids level of 38.1% by weight, a volatile organic level of 10.5% by weight, a binder level of 34.2% by weight, a pigment level of 4.3% by weight and a water level of 51.4% by weight. The unpigmented base has a solid level of 35.4% by weight, volatile organic level of 9.5% by weight, a water level of 55.1% by weight and a pH of 8.5.

Preparation of Component C—Reducer Base

To 1953.2 g of deionized water, 31.3 g of Laponite RD manufactured by Laporte Industries and 10.7 g of Pluracol P1010 manufactured by BASF Corporation was added. The resulting solution was then agitated for one hour until the Laponite RD was completely dispersed. To this solution was added 1953.2 g of deionized water. The resulting mixture had a Laponite RD level of 0.79% by weight and a polypropylene glycol level of 0.27% by weight.

EXAMPLE 2—PREPARATION OF A WATER BORNE RED METALLIC BASE COAT

| Component | Parts by Weight |
| --- | --- |
| Component A Aluminum Base | 16.0 |
| Component B Pigmented Base | 54.0 |
| Component C Reducer Base | 85.0 | the above formula was used to prepare a red metallic base coat. The order of addition is that listed. After each introduction of a component, the entire solution was stirred. The base coat was sprayed on panels primed with an epoxy primer. The base coat was sprayed on the substrate using conventional spray equipment until hiding was achieved. The base coat was allowed to flash for 30 minutes and then clear coated with a transparent coating based on isocyanate technology. The final properties of the base coat after coating with a conventional polyurethane clear coat are listed below, including appearance ratings.

| Properties of the Red Metallic Base Coat and Base Coat, Clear Coat System | |
| --- | --- |
| Property | Value |
| Water | 72.5% |
| Volatile Organic | 7.4% |
| Pigment | 2.4% |
| Nonvolatile | 20.1% |
| Binder | 10.8% |
| Weight per Gallon (lbs/gal) | 8.4 |
| VOC (lbs/gal) | 2.4 |
| Gloss, 20 deg | 90 |
| DOI | 84 |
| Adhesion | good |
| Film Thickness (mil) | 0.34 |
| Humidity | good |
| Water Spray | excell. |
| Metal Control | excell. |

EXAMPLE 3—Preparation of a Water Borne Silver Metallic Base

| Component | |
| --- | --- |
| Component A Aluminum Base | 16.0 g |
| Component B Unpigmented Base | 54.0 g |
| Component C Reducer Base | 85.0 g |

The above formula was used to prepare a silver metallic vase coat. The order of addition is that listed. After each introduction of a component, the entire solution was stirred. The base coat was sprayed on panels primed with an epoxy primer. The base coat was sprayed on the substrate using conventional spray equipment until hiding was achieved. The base coat was allowed to flash for 30 minutes and then clear coated with a transparent coating based on isocyanate technology. The final properties of the base coat after coating with a conventional polyurethane clear coat are listed below, including appearance ratings.

| Properties of the Silver Metallic Base Coat and Base Coat, Clear Coat System ||
| --- | --- |
| Property | Value |
| Water | 73.1% |
| Volatile Organic | 7.7% |
| Pigment | 2.7% |
| Nonvolatile | 19.2% |
| Binder | 11.2% |
| Weight/Gallon (lbs/gal) | 8.4 |
| VOC (lbs/gal) | 2.6 |
| Gloss, 20 | 89 |
| DOI | 90 |
| Adhesion | good |
| Film Thickness (mil) | 0.53 |
| Humidity | good |
| Water Spray | excell. |
| Metal Control | excell. |

We claim:

1. A method of forming a water-borne metallic base coat kit composition consisting essentially of mixing:

A. an aluminum base consisting essentially of:
  (1) a water reducible solvent borne acrylic resin having nonionic, urethane and acid functionality consisting essentially of:
    (a) at least one monomer having acid functionality
    (b) at least one monomer having urethane and nonionic functionality prepared by the reaction of: a capped polyether having a single active hydrogen functionality with a polyisocyanate compound to produce a partially capped isocyanate intermediate which is further reacted with a first ethylenically unsaturated compound having at least one active hydrogen group to produce a second ethylenically unsaturated compound having urethane and nonionic functionality
    (c) one or more additional ethylenically unsaturated compounds
  (2) a solvent borne aluminum flake at a level of 4-30% by weight,
  (3) 25-55% total solids by weight,
  (4) 35-50% total water miscible organic solvent by weight,
  (5) 5-35% total binder by weight.
B. an aqueous pigmented base consisting essentially of an acrylic latex resin and,
C. an aqueous reducer base consisting essentially of a pregelled sodium lithium magnesium silicate hectorite clay rheology control agent.

2. A method of forming a water-borne metallic base coat kit composition consisting essentially of mixing:

A. an aluminum base consisting essentially of:
  (1) a water reducible solvent borne acrylic resin having nonionic, urethane and acid functionality consisting essentially of:
    (a) at least one monomer having acid functionality
    (b) at least one monomer having urethane and nonionic functionality prepared by the reaction of: a capped polyether having a single active hydrogen functionality with a polyisocyanate compound to produce a partially capped isocyanate intermediate which is further reacted with a first ethylenically unsaturated compound having at least one active hydrogen group to produce a second ethylenically unsaturated compound having urethane and nonionic functionality.
    (c) and a third ethylenically unsaturated compound
  (2) an aluminum flake treated for water stability at a level of 4-30% by weight.
  (3) 25-55% total solids by weight,
  (4) 35-50% total water miscible organic solvent by weight.
  (5) 5-35% total binder by weight.
B. an aqueous pigmented base consisting essentially of an acrylic latex resin and,
C. an aqueous reducer base consisting essentially of a pregelled sodium lithium magnesium silicate hectorite clay rheology control agent.

* * * * *